United States Patent [19]

Leary

[11] Patent Number: 5,378,438
[45] Date of Patent: Jan. 3, 1995

[54] BENEFICATION OF TITANIFEROUS ORES

[75] Inventor: Kevin J. Leary, Waverly, Tenn.

[73] Assignee: E. I. Du Pont de Nemours and Company, Wilmington, Del.

[21] Appl. No.: 983,486

[22] Filed: Nov. 30, 1992

[51] Int. Cl.⁶ .................. C01G 23/00; C01G 23/04
[52] U.S. Cl. ........................... 423/80; 423/69; 423/84; 423/151
[58] Field of Search .............. 423/69, 84, 151, 80

[56] References Cited

U.S. PATENT DOCUMENTS

| | | | |
|---|---|---|---|
| 1,106,407 | 8/1914 | Rossi et al. | 423/80 |
| 1,734,034 | 11/1929 | Gregory | 423/84 |
| 1,760,992 | 6/1930 | Palmer | 423/80 |
| 1,932,087 | 10/1933 | Richter | 423/84 |
| 2,130,565 | 9/1937 | Schmidt | 423/84 |
| 2,941,863 | 6/1960 | Wainer | 423/84 |
| 3,112,178 | 11/1963 | Judd | 423/80 |
| 3,816,099 | 6/1974 | Stewart et al. | 423/80 |

FOREIGN PATENT DOCUMENTS

| | | | |
|---|---|---|---|
| 113553 | 7/1941 | Australia | 423/80 |
| 247110 | 1/1963 | Australia | 423/80 |
| 526628 | 6/1956 | Canada | 423/84 |
| 20688 | 5/1974 | Japan | 423/84 |
| 846468 | 8/1960 | United Kingdom . | |

*Primary Examiner*—Wayne Langel

[57] ABSTRACT

A process for beneficiation of titaniferous ores is disclosed in which a titanium and iron-containing ore, such as ilmenite is heated with potassium hydroxide, e.g. at temperatures of about 350°–650° C. and then treating the product with carbon monoxide and water. After cooling and washing the solid product can be separated by magnetic means into an iron-containing magnetic fraction and a titanium-containing fraction.

5 Claims, No Drawings

BENEFICATION OF TITANIFEROUS ORES

FIELD OF THE INVENTION

This invention relates to the beneficiation of titaniferous ore, more especially but not exclusively to the beneficiation of ilmenite.

BACKGROUND OF THE INVENTION & PRIOR ART

GB-A-846,468 (Columbia Southern Chemical Corp.) describes a beneficiation process in which ilmenite is heated with sodium hydroxide. The mixture forms two phases; a liquid, titanium rich phase and a solid, titanium poor phase. The phases are separated while hot and the alkali leached away to leave a titanium enriched residue.

A problem with the prior art process is that it is difficult to manipulate the hot phases. Moreover, the caustic consumption is very high, which makes the process unattractive commercially.

SUMMARY OF THE INVENTION

According to one aspect the invention provides a process for separating a titanium-rich component from a mineral containing titanium and iron values which comprises the steps of:

(a) heating the mineral in admixture with a flux with which the Ti and Fe values are reactive at elevated temperature.

(b) adjusting the conditions to cause at least one of the metals Ti or Fe to form a separable oxide.

(c) cooling the mixture to a temperature at which it can be readily manipulated.

(d) separating the separable oxide from said mixture and at least partially recovering the flux for recycle to step (a).

The flux may be reactive with one or both of the titanium and iron compounds present in the ore or other mineral.

Preferably, the flux is a basic substance, e.g. an alkali metal hydroxide, carbonate, phosphate or borate. Especially good results have been obtained with potassium hydroxide, as will be described in more detail below. In the case of an alkali metal hydroxide flux, both iron and titanium will react with the alkali metal hydroxide (MOH). At the temperatures in the range of about 350° to 650° C., the titanium values dissolve in the flux, while the iron forms a solid alkali metal ferrate compound ($MFeO_2$), dispersed in the flux.

The iron compound can be converted into a readily separable oxide by contacting the melt with carbon monoxide and water vapor. The water vapor makes the melt more acidic, and the carbon monoxide reduces the iron to magnetite ($Fe_3O_4$) which is precipitated as relatively large black particles. These particles are separable in an initial separation stage by magnetic means. Although other reductants could be used, they are not as effective. Hydrogen, for example, tends to reduce the iron compound all the way to metallic iron, which is more difficult to separate. The treatment with CO and water vapour converts the alkali metal hydroxide also to the corresponding carbonate.

The titanium compound remains in the cooled and solidified carbonate from which it is recovered by washing and hydrolysis to precipitate as titanium (hydr)oxides.

During the treatment with carbon monoxide and water vapor, a substantial fraction of the titanium reacts to form a Ti—O—H species resembling $H_2Ti_4O_9.H_2O$. The titanium species is separated from the melt by washing and hydrolyzing any unconverted titanium oxide.

Because the particle size of the precipitated titanium is much smaller than that of the magnetite, a further separation step can be carried out by classification in conjunction with magnetic separation.

DESCRIPTION OF PREFERRED EMBODIMENTS

The source mineral, which is conveniently ilmenite, is heated with the flux, e.g. potassium hydroxide. Preferably, the mixture is heated at a temperature of about 350°–650° C., especially at a temperature of about 450°–550° C. While not wishing to be bound by any particular theory, it is believed that ilmenite when heated with potassium hydroxide hemihydrate under dry, inert or reducing conditions at these temperatures reacts to form solid $KFeO_2$ and titanium oxide dissolved in molten KOH. Certainly, $KFeO_2$ was detected by X-ray analysis in the cooled flux after heating ilmenite with KOH.

The mixture is then treated with carbon monoxide and water at elevated temperature. The $KFeO_2$ is converted by reaction with CO and water into magnetite. Under these conditions potassium carbonate is formed, presumably by reaction of KOH with carbon monoxide. The titanium oxide is converted into a material containing titanium, oxygen and hydrogen which reprecipitates. The X-ray diffraction pattern of this material is similar to that of $H_2Ti_4O_9.H_2O$. The water is thought to render the mixture sufficiently acidic to cause the iron and titanium oxides to be more stable than the potassium salts. The carbon monoxide acts to control the melt potential such that magnetite is formed. Carbon dioxide appears to have an adverse effect on both steps and should, therefore, be avoided or removed.

The temperature range stated above is preferred for both the dissolution and reprecipitation steps. At temperatures substantially below 550° C., the transformation of $KFeO_2$ into magnetite tends to be incomplete and at higher temperatures the magnetite can become soluble. Both processes can result in increases in the iron content of the titanium-enriched fraction. Although thermodynamic considerations predict that a reprecipitation temperature of about 200° C. would be favourable for converting $KFeO_2$ to $Fe_3O_4$, experimentation showed that the reaction proceeded more rapidly as the temperature was raised to about 450° C. On raising the temperature above 450° C., it was found that the separation of Ti and Fe improved steadily and reached a maximum at about 550° C., when it began to decrease. On the other hand, X-ray studies indicated that a dissolution temperature of about 200° C. was generally sufficient to convert the iron values to $KFeO_2$ and the titanium to $TiO_3^{-2}$. Therefore, the efficiency of the separation appears to depend largely on the optimum temperature for the conversion of $KFeO_2$ to $Fe_3O_4$. Since a temperature in the range of about 400° to 600° C. does not appear to be detrimental to the dissolution reaction, it is generally convenient to conduct both these stages of the process at about the same temperature.

The flux/mineral ratio appears to have an influence on the separability of the titanium and iron values. Best results have been obtained using a weight ratio of KOH to mineral of about 1:1. It is advantageous to grind the mineral to a finely-divided form so as to ensure a uniform mixture of KOH and mineral. At a mixing ratio of about 1:1, the mixture, even at temperatures of around 500° C., has the consistency of a wet mud, rather than a liquid. Penetration of the $CO/H_2O$ gas stream into the mixture may be difficult to achieve. Therefore, the reaction is preferably conducted in a shallow bed or in a reactor in which the mixture is constantly turned over and exposed to the gas phase, for example, in a rotary kiln reactor. Nickel or nickel alloys are resistant to attack by alkali metal hydroxides and may be used for the construction of the surfaces of the reactor, which will be exposed to the mixture.

After reaction, the mixture is cooled and washed with water. The potassium hydroxide is dissolved as potassium carbonate, formed by reaction of potassium hydroxide with carbon monoxide. The potassium carbonate containing solution can be treated with calcium hydroxide to give calcium carbonate and potassium hydroxide. Filtration gives a solution of potassium hydroxide which may be recycled.

The washing step also hydrolyses any unconverted titanic species into titanium (hydr)oxides. The residue contains black magnetic particles which are primarily magnetite and white non-magnetic particles which are primarily titanium (hydr)oxides. The two phases may be at least partially separated, for example, magnetically to give two phases; one titanium-enriched and the other iron-enriched.

The process of the present invention may result in particles which are very small, including those less than 10 μm in size. When working with such small particles, column flotation techniques may be employed to improve the separation efficiency.

Although the $Fe_3O_4$ produced in the present invention is potentially a saleable product, the primary objective of the process is an enriched source of pigmentary $TiO_2$. The Ti—O—H product of the process may be fed to a fluidised bed chlorinator for conversion to $TiCl_4$ in the well-known chloride process. Alternatively, the Ti—O—H product of this invention may be purified sufficiently to be converted directly to $TiO_2$. For example, it may be possible to convert the Ti—O—H directly to pigment in a hydrothermal process or in a molten salt process and then calcined to produce pigmentary $TiO_2$.

The following Examples will illustrate the invention.

EXAMPLE 1

14 grams of $KOH.0.5H_2O$ pellets were ground in a mortar and pestle, and thoroughly mixed with 14 grams of synthetic ilmenite, $FeTiO_3$ (52% $TiO_2$ by weight). The mixture was divided into roughly equal portions which were placed in two Hexalloy SA SiC crucibles. Each sample was placed in a separate tube furnace and treated similarly. For each, 200 cc/min (STP) of helium were passed over the sample which was heated in 90 minutes to 550° C. During heating, evaporation of water from the $KOH.0.5H_2O$ produced a relatively dry melt. The sample was held at 550° C. for 4 hours, and then the gas was switched to a mixture of 200 cc/min He and 20 cc/min CO flowing through water heated to 90° C. If equilibrium were achieved in the water bath, the gas mixture over the sample would correspond to 200 cc/min He, 20 cc/min CO, and 470 cc/min $H_2O$. The $He/CO/H_2O$ gas mix was passed over each sample at 550° C. for 4 hours, and then the samples were removed from the furnace and allowed to cool in air for 5 to 10 minutes. During cooling in air, the top of each sample turned slightly reddish, presumably due to oxidation of some of the $Fe_3O_4$ to $Fe_2O_3$; however, the amount of oxidation appeared to be small.

After cooling, the samples were mixed together in a water bath, filtered, and washed with deionized water until neutral. Observation of the washed product under a light microscope revealed clearly distinct black ($Fe_3O_4$) and white (Ti—O—h) particles. The neutralised sample was then dried overnight in a vacuum oven. X-ray diffraction analysis of a portion of the sample showed magnetite ($Fe_3O_4$) as the major phase, with a minor phase similar to a highly oriented phase of $H_2Ti_4O_9.H_2O$. Trace to minor phases of Fe and $FeTiO_3$ were also observed.

The remainder of the sample was slurried in deionzied water, ground for 15 minutes in a paint shaker using zirconia beads, and then separated into a magnetic and a non-magnetic fraction on a Davis tube magnetic separator.

The non-magnetic fraction was white and required filtration, whereas the magnetic fraction was black and the water could largely be removed by decantation. Both samples were dried. X-ray fluorescence analysis results are shown in Table 1.

TABLE I

| Magnetic Fraction | | | Non-magnetic Fraction | | |
| --- | --- | --- | --- | --- | --- |
| | | Dry Basis | | | Dry Basis |
| $TiO_2$ | 19.60% | 20% | $TiO_2$ | 65.61% | 72% |
| $Fe_2O_3$ | 72.10% | 75% | $Fe_2O_3$ | 11.32% | 12% |
| $SiO_2$ | 0.65% | | $SiO_2$ | 0.25% | |
| $Al_2O_3$ | 0.00% | | $Al_2O_3$ | 2.40% | |
| $ZrO_2$ | 1.18% | | $ZrO_2$ | not analysed | |
| $K_2O$ | 2.13% | | $K_2O$ | 11.47% | |
| Total: | 95.54% | | Total: | 91.26% | |

The results clearly show the partitioning of the iron and titanium between the two phases (synthetic $FeTiO_3$ contains roughly 52% by weight). However, observation of the two fractions under the microscope indicates that there are many liberated Ti—O—H particles trapped in the magnetic fraction, and many magnetic particles trapped in the non-magnetic fraction. The reason for this is presumably that magnetic separation is not very effective for such small particles (<10 microns). The reason for the totals in Table 1 not being closer to 100% is that moisture is not accounted for in the X-ray fluorescence analysis. Thus, on a dry basis, the percentages will be higher. The presence of $ZrO_2$ in the products is due to contamination from the grinding media, and can be largely avoided by proper choice of the grinding media. The source of the $Al_2O_3$ contamination in the non-magnetic fraction is not clear, since the starting materials did not contain a significant amount of $Al_2O_3$, and is presumably due to contamination from the grinding media. In many cases, the $Al_2O_3$ contamination is not observed.

In many cases, a substantial amount of $K_2O$ is observed in the products, particularly in the non-magnetic fraction. The form of the potassium is not clear at this time, but is believed to be an adsorbate on the high surface area Ti—O—H solids. The potassium can be removed by leaching or by ion exchange with, e.g. $Ca(OH)_2$. In the latter case, much of the potassium can be recovered as KOH and recycled, and the calcium can be neutralized and disposed of. Also, better control of the process is expected to reduce the potassium contamination.

EXAMPLE 2

14 grams of Florida ilmenite (65% $TiO_2$, 30% $Fe_2O_3$) were ground to less than 400 mesh (<38μm) and mixed with 14 grams of $KOH.0.5H_2O$ and placed in two separate boats and treated as described in Example 1. The X-ray fluorescence analysis of the magnetically separated samples is given in Table II.

TABLE II

| Magnetic Fraction | | Dry Basis | Non-magnetic Fraction | | Dry Basis |
| --- | --- | --- | --- | --- | --- |
| $TiO_2$ | 30.72% | 32.6% | $TiO_2$ | 61.49% | 70.5% |
| $Fe_2O_3$ | 54.41% | 57.7% | $Fe_2O_3$ | 9.33% | 10.7% |
| $SiO_2$ | 1.69% | | $SiO_2$ | 0.89% | |
| $Al_2O_3$ | 0.67% | | $Al_2O_3$ | 0.63% | |
| $K_2O$ | 3.71% | | $K_2O$ | 11.02% | |
| Total: | 94.22% | | Total: | 87.24% | |

Again, the partitioning of the iron and titanium between the two phases can be clearly observed, although a better separation technique would likely yield far superior results. As seen in Example 1, there is substantial potassium contamination in the products which could be removed by acid leaching or ion exchange.

I claim:

1. A process for separating a titanium-rich component from a mineral containing titanium and iron values which consists essentially of the separate steps of:
   (a) heating an intimate mixture of the mineral with an alkali metal hydroxide or compound which decomposes on heating to form an alkali metal hydroxide to form a melt of alkali metal hydroxide containing the iron and titanium values;
   (b) precipitating iron values from the melt by contacting the melt with a reducing atmosphere thereby causing conversion of iron values to magnetite;
   (c) cooling the mixture to a temperature at which the magnetite can be easily removed from the melt;
   (d) separating the magnetite from the melt; and
   (e) recovering the titanium values and alkali metal hydroxide and recycling the alkali metal hydroxide to step (a).

2. A process according to claim 1, wherein the alkali metal hydroxide is potassium hydroxide.

3. A process according to claim 2, wherein the reducing atmosphere comprises carbon monoxide and water vapour.

4. A process according to claim 3, wherein the atmosphere contains about 1 to 30% of CO and less than about 1% of $CO_2$.

5. A process according to claim 3, wherein the potassium hydroxide is converted to potassium carbonate by reaction with CO and is recovered for recycle by dissolution in water.

* * * * *